United States Patent
Assow

(10) Patent No.: US 6,459,595 B2
(45) Date of Patent: Oct. 1, 2002

(54) METHOD AND ARRANGEMENT FOR REGULATING LOW OUTPUT VOLTAGES IN MULTIPLE OUTPUT FLYBACK DC/DC CONVERTERS

(75) Inventor: Bengt Assow, Norsborg (SE)

(73) Assignee: Telefonaktiebolaget LM Ericsson, Stockholm (SE)

( * ) Notice: Subject to any disclaimer, the term of this patent is extended or adjusted under 35 U.S.C. 154(b) by 0 days.

(21) Appl. No.: 09/826,923

(22) Filed: Apr. 6, 2001

(30) Foreign Application Priority Data

Apr. 7, 2000  (SE) .............................................. 0001300

(51) Int. Cl.[7] .......................................... H02M 3/335
(52) U.S. Cl. .................... 363/21.14; 363/89; 363/21.17
(58) Field of Search ............................... 363/21.14, 89, 363/21.17, 21.18

(56) References Cited

U.S. PATENT DOCUMENTS

| | | | |
|---|---|---|---|
| 4,847,742 A | * | 7/1989 | Ohashi et al. ........... 363/21.14 |
| 5,619,403 A | * | 4/1997 | Ishikawa et al. ............ 363/131 |
| 6,038,150 A | | 3/2000 | Yee et al. |
| 6,075,352 A | * | 6/2000 | Kates et al. ................. 323/266 |
| 6,330,169 B2 | * | 12/2001 | Mullett et al. ................ 363/16 |

\* cited by examiner

Primary Examiner—Shawn Riley
(74) Attorney, Agent, or Firm—Burns Doane Swecker & Mathis, LLP

(57) ABSTRACT

Methods and arrangements are provided for regulating low output voltages in multiple output flyback DC/DC converters that generate, in addition to a main output DC voltage, at least one additional output DC voltage. Converter arrangements include a transformer with a primary winding connected in series with a primary switch, a first secondary winding connected in series with a first rectifier to a first output capacitor for generating the main output DC voltage, and a secondary winding connected in series with a synchronous rectifier to a second output capacitor for generating the additional output DC voltage. An error amplifier is arranged to compare the actual value of the additional output DC voltage with a desired value, and a control circuit is interconnected between the error amplifier and the synchronous rectifier to adjust the turn-off time of the synchronous rectifier in response to the ratio between the actual value of the additional output DC voltage and the desired value to adjust the actual value to the desired value.

8 Claims, 2 Drawing Sheets

METHOD AND ARRANGEMENT FOR REGULATING LOW OUTPUT VOLTAGES IN MULTIPLE OUTPUT FLYBACK DC/DC CONVERTERS

TECHNICAL FIELD

The invention relates generally to multiple output flyback DC/DC converters and more specifically to a method and an agement for regulating low output voltages to tight tolerances in multiple output flyback DC/DC converters.

BACKGROUND OF INVENTION

There is a demand for converters supplying in addition to a main output DC voltage, at least one additional output DC voltage lower than the main output voltage.

If diodes are used for generating the additional output DC voltages, the voltage drop across the diodes can be as high as 0.5 V. This means that for low output voltages, e.g. $\leq 3.3$ V, the efficiency will be low.

When high efficiency is needed, synchronized rectification has to be used since the voltage drop across synchronous rectifiers, i.e. MOSFETs, is much lower than across diodes.

In multiple output converters, the main output voltage is regulated in a manner known per se by regulating the duty cycle of the primary switch. However, additional output voltages can not be regulated in multiple output converters by regulating the duty cycle of the primary switch but have to be separately regulated, e.g. by means of complicated switched series-regulators.

SUMMARY OF THE INVENTION

The object of the invention is to bring about a method and an arrangement for controlling a MOSFET used as synchronous rectifier to regulate low output voltages to tight tolerances.

This is attained in accordance with the invention by controlling the switch-off time of the MOSFET to vary its on-period.

Hereby, the output voltage can be controlled between the voltage drop in the body diode of the MOSFET and the saturation voltage of the MOSFET. This voltage difference is only about 0.3 to 0.4 V but large enough for regulating a 3.3 V output voltage to tight tolerances.

BRIEF DESCRIPTION OF THE DRAWING

The invention will be described more in detail below with reference to the appended drawing on which

DESCRIPTION OF THE INVENTION

Figure 1:
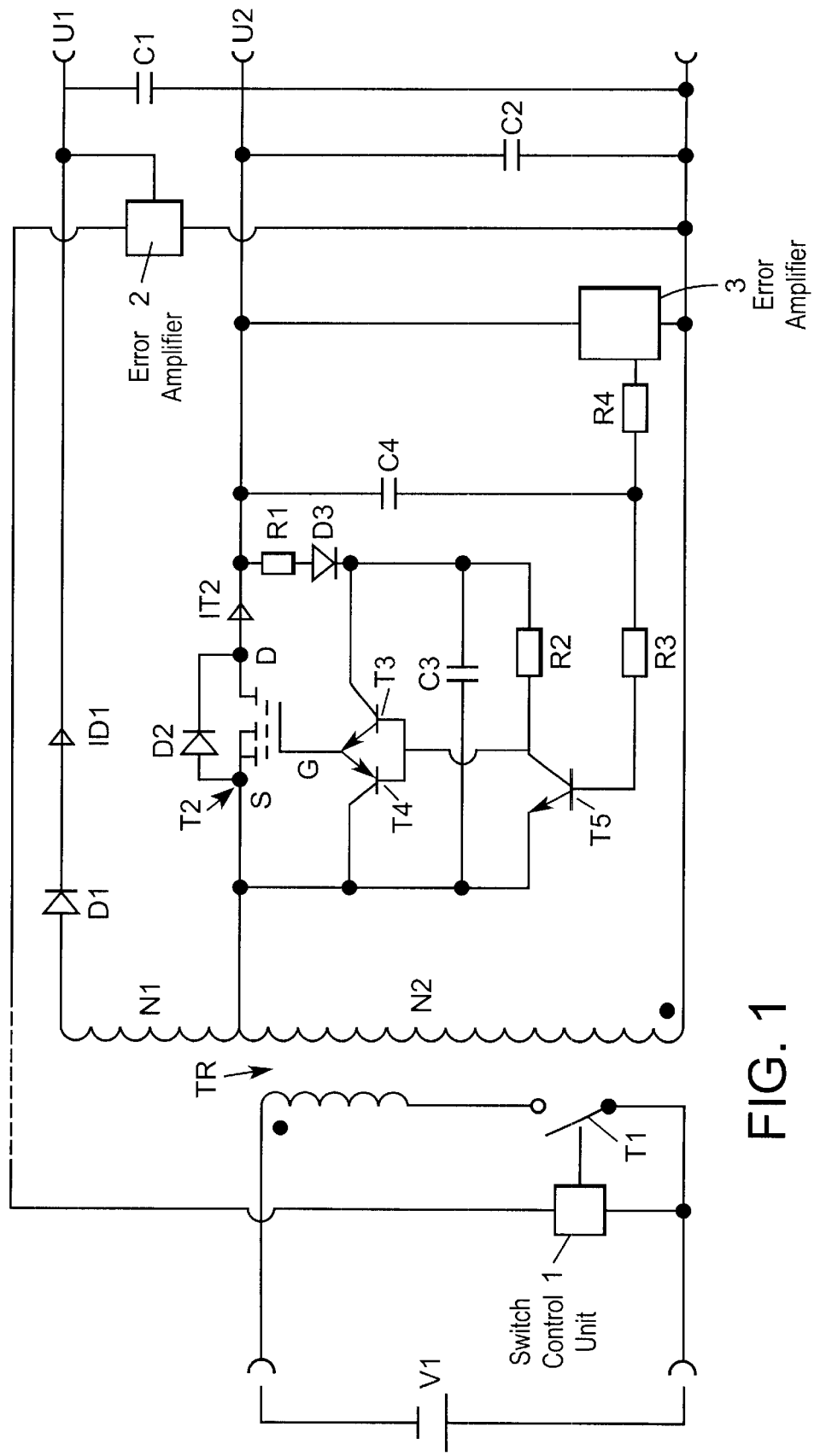
FIG. 1 shows an embodiment of a multiple output flyback DC/DC converter in accordance with the invention.

FIG. 1 shows an embodiment of a multiple output flyback DC/DC converter in accordance with the invention, In the embodiment in FIG. 1, in addition to a main output voltage U1, a single additional output voltage U2 is generated. It is however to be understood that it is possible to generate more than one additional output voltage. In such a case, for every additional output voltage to be generated, there has to be an arrangement corresponding to the arrangement for generating the additional output voltage U2 to be described below.

The converter in FIG. 1 comprises in a manner known per se, a transformer TR having a primary winding connected in series with a primay switch T1 to a schematically illustrated DC voltage source V1, and a secondary winding N1+N2 connected in series with a diode D1 to an output capacitor C1 for generating the main output DC voltage U1.

The on and off periods of the switch T1, i.e. its duty cycle, is controlled by a switch duty cycle regulator or switch control unit 1 in response to output signals of an error amplifier 2 connected with its input terminals across the capacitor C1 for generating output signals in response to differences between the acts value of the output voltage U1 and a desired value set within the error amplifier 2.

To generate the additional output DC voltage U2 in accordance with the invention, in the embodiment in FIG. 1, a part N2 of the secondary winding of the transformer TR is connected in series with a synchronous rectifier in the form of a MOSFET T2 to an output capacitor C2.

Instead of a common secondary winding N1+N2, it is to be understood that separate secondary windings (not shown) can be used for generating the main and the additional output DC voltages U1 and U2, respectively.

In a manner known per se, the MOSFET T2 comprises a source S, a drain D, and a gate G as well as a body diode D2 connected with its anode to the source S and with its cathode to the drain D of the MOSFET T2.

In the embodiment shown in FIG. 1, the D of the MOSFET T2 is connected to the source S of the MOSFET T2 via a resistor R1 in series with a diode D3 and a capacitor C3.

The interconnection point between the diode D3 and the capacitor C3 is connected to be collector of a transistor T3. The emitter of the transistor T3 is connected to the gate G of the MOSFET T2 and to the emitter of a T4 whose collector is connected to the source S of the MOSFET T2.

The transistors T3 and T4 are two emitter-followers that quickly can charge/discharge the gate G of the MOSFET T2.

The bases of the transistors T3 and T4 are interconnected and connected via 4 resistor R2 to the collector of the transistor T3.

The interconnected bases of the transistors T3 and T4 are also connected to the collector of a transistor T5 whose emitter is connected to the source S of the MOSFET T2.

The base of the transistor T5 is connected via resistor R3 in series with a capacitor C4 to the drain D of the MOSFET 12.

In accordance with the invention, the interconnection point between the resistor R3 and the capacitor C4 is connected via a resistor R4 to an output terminal of an error amplifier 3. The error amplifier 3 is connected with its input terminals across the capacitor C2 for generating output signals in response to differences between the actual value of the additional output voltage U2 and a desired value set within the error amplifier 3 to control the MOSFET T2.

As mentioned above, the switch T1 is the primary switch of the flyback converter. When the switch T1 is on, magnetic energy is stored in the transformer TR and the voltage across the secondary winding of the transformer TR is assumed to be negative. When the primary switch T1 turns off, the voltage across the secondary winding of the transformer TR goes positive and a current ID1 will flow through the diode D1 to charge the capacitor C1, and a current IT2 will flow through the MOSFET T2 to charge the capacitor C2.

With reference to the diagrams in FIGS. 2A–2F, the operation of the converter illustrated in FIG. 1 during one off-period of the primary switch T1 will now be described in more detail.

It should be pointed out that the diagrams in FIGS. 2A–2F are essentially theoretical, i.e. more or less idealized.

Figure 2A:
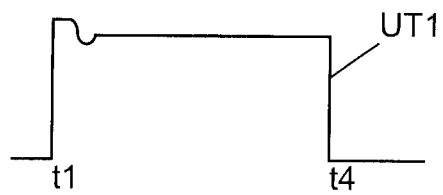
FIGS. 2A–2F are diagrams illustrating different signals in the embodiment in FIG. 1.

The primary switch T1 is supposed to be on from the beginning and is supposed to be turned off at time t1 and turned on a at time t4 as illustrated in FIG. 2A.

When the primary switch T1 is on, the voltage across the winding N2 is negative and the capacitor C3 is charged via the resistor R1 in series with the diode D3.

At time t1 when the primary switch T1 turns off, the body diode D2 of the MOSFET T2 begins to conduct to charge the output capacitor C2.

Figure 2B:
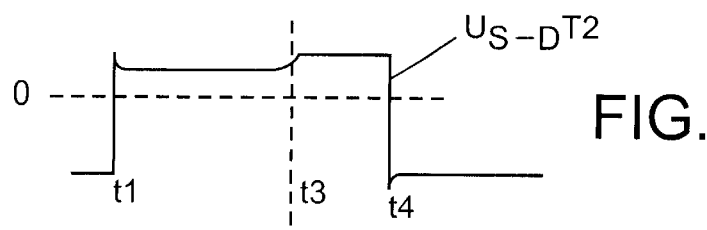

In FIG. 2B, the source-drain voltage $U_{S-D}$ T2 of the MOSFET T2 is illustrated.

Base current will be supplied to the transistor T3 via the resistor 2. The gate G of the MOSFET T2 will be charged causing the MOSFET T2 to become saturated.

Figure 2C:
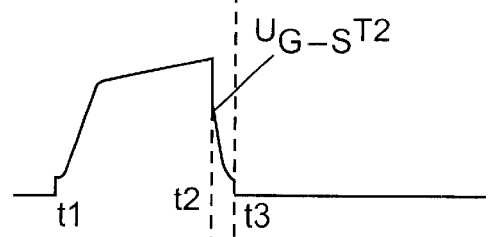

FIG. 2C illustrates the gate-source voltage $U_{G-S}$ T2 of the MOSFET T2.

In the following description, it is assumed that, at time tl, the output voltage U2 is higher than the desired value set within the error amplifier 3.

The error amplifier 3 senses that the output voltage U2 is higher than the desired value and starts to discharge the capacitor C4 via the resistor R4.

Figure 2D:
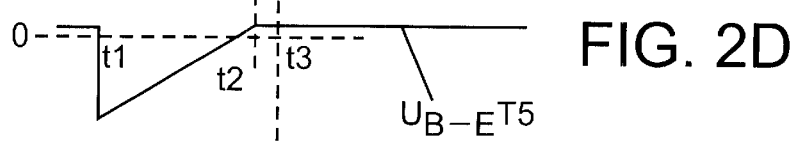

This causes the transistor T5 to start to conduct at time t2 as apparent from FIG. 2D that illustrates the base-emitter voltage $U_{B-E}$T5 of the transistor T5.

When the transistor T5 starts to conduct at time t2, the gate charge of the gate G of the MOSFET T2 will begin to be discharged via the transistor T4 as illustrated in FIG. 2C.

The gate charge of the gate G is supposed to have been fully discharged at time t3.

Thus, at time t3, the MOSFET T7 turns off.

Figure 2E:
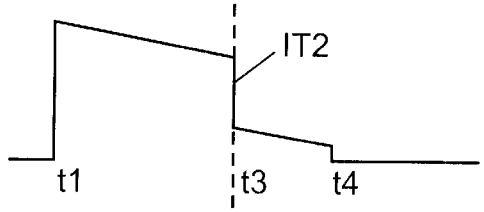

When the MOSFET T2 turns off at time t3, the current lT2 through it will drop as illustrated in FIG. 2E. However, due to imperfections of the transformer TR and the existence of the body diode D2 in the MOSFET T2, the current IT2 will not drop to zero.

Figure 2F:
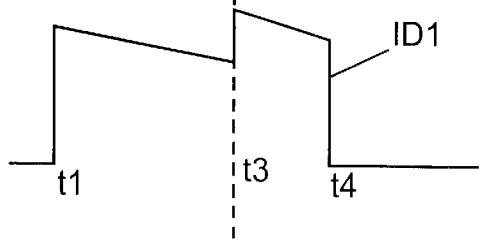

The drop of the current IT2 will cause a corresponding jump of the current Ml through the diode D1 as illustrated in FIG. 2F.

This jump of the current ID1 tends to increase the output voltage U1.

The error amplifier 2 will sense this increase of the man output voltage U1 and in response hereto control the duty cycle regulator 1 to adjust the duty cycle of the primary switch T1 in such a manner that the main output voltage U1 is decreased to the desired value.

Between time T3 when the MOSFET T2 turns off, and time t4 when the primary switch T1 turns on again, the currents IT2 and ID1 decrease due to the fact that the energy stored in the transformer TR decreases.

By controlling the MOSFET in this manner, i.e. by adjusting its turn-off time in response to that the actual value of the additional voltage U2 exceeds the desired value, it is possible to regulate low additional output DC voltages in the interval between the voltage drop of the body diode D2 and the saturation voltage of the MOSFET T2 to tight tolerances.

What is claimed is:

1. A method of generating, in addition to a main output DC voltage, at least one additional output DC voltage in a flyback DC/DC converter having a transformer with a primary winding connected in series with a primary switch to an input DC voltage source, a first secondary winding connected in series with a first rectifier to a first output capacitor for generating said main output DC voltage across said first output capacitor, and a secondary winding connected in series with a second rectifier to a second output capacitor, for generating said additional output DC voltage across said second output capacitor, wherein said second rectifier is a synchronous rectifier, the method comprising:

turning on said synchronous rectifier in response to current generated in a flyback operation of the second secondary winding traversing said synchronous rectifier;

comparing the actual value of said additional output DC voltage with a desired value; and adjusting the turn-off time of the synchronous rectifier in response to the ratio between the actual value and the desired value to adjust the actual value to the desired value.

2. An arrangement for generating, in addition to a main output DC voltage, at least one additional output DC voltage in a flyback DC/DC converter, comprising:

a transformer with a primary winding connected in series with a primary switch to an input DC voltage source;

a first secondary winding connected in series with a first rectifier to a first output capacitor for generating said main output DC voltage across said first output capacitor; and a second secondary winding connected in series with a second rectifier to a second output capacitor for generating said additional output DC voltage across said second output capacitor, wherein:

said second rectifier is a synchronous rectifier configured to turn on in response to current generated in a flyback operation of the second secondary winding traversing said synchronous rectifier;

an error amplifier is arranged to compare the actual value of said additional output DC voltage with a desired value; and a control circuit is interconnected between the error amplifier and the synchronous rectifier to adjust the turn-off time of the synchronous rectifier in response to the ratio between the actual value of said additional output DC voltage and the desired value to adjust the actual value to the desired value.

3. The method according to claim 1, wherein the synchronous rectifier is a MOSFET synchronous rectifier.

4. The method according to claim 1, further comprising:

comparing the actual value of said main output DC voltage with a desired value to create an error signal; and controlling said primary switch according to said error signal.

5. The method according to claim 4, wherein adjusting the actual value further comprises:

adjusting the turn off time of the synchronous rectifier such that a turn off causes a corresponding current jump in the first secondary winding, thereby causing a generation of the error signal.

6. The arrangement according to claim 2, wherein the synchronous rectifier is a MOSFET synchronous rectifier.

7. The arrangement according to claim 2, further comprising:

a second error amplifier arranged to compare the actual value of said main output DC voltage with a second desired value to create a second error signal; and a switch control unit for controlling said primary switch according to said second error signal.

8. The arrangement according to claim 7, wherein when the error amplifier indicates that the actual value exceeds the desired value, current in the first secondary winding jumps an amount corresponding to the turn off time, thereby causing a generation of the second error signal.

* * * * *